United States Patent [19]

Griffin et al.

[11] Patent Number: 5,303,145
[45] Date of Patent: Apr. 12, 1994

[54] METHOD AND APPARATUS FOR MEETING CONFIRMATION IN A DATA PROCESSING SYSTEM

[75] Inventors: Susan F. Griffin; David L. Griffin, both of Keller; Patrick J. Keane, Grapevine, all of Tex.

[73] Assignee: International Business Machines Corporation, Armonk, N.Y.

[21] Appl. No.: 633,875

[22] Filed: Dec. 26, 1990

[51] Int. Cl.⁵ .......................... G06F 15/21; G06F 7/00
[52] U.S. Cl. .................................... 364/401; 364/402; 345/168; 395/100
[58] Field of Search ...................... 364/401, 402, 518; 340/706

[56] References Cited

U.S. PATENT DOCUMENTS

| | | | |
|---|---|---|---|
| 4,162,610 | 7/1979 | Levine | 58/148 |
| 4,430,639 | 2/1984 | Bennett | 340/310 A |
| 4,548,510 | 10/1985 | Levine | 368/10 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |
| 4,769,796 | 9/1988 | Levine | 368/29 |
| 4,774,697 | 9/1988 | Aihara | 368/41 |
| 4,783,800 | 11/1988 | Levine | 379/67 |
| 4,807,155 | 2/1989 | Cree et al. | 364/518 |
| 4,817,018 | 3/1989 | Cree et al. | 364/518 |
| 4,866,611 | 12/1989 | Cree et al. | 364/300 |
| 5,050,077 | 12/1991 | Vincent | 364/401 |
| 5,070,470 | 12/1991 | Scully et al. | 364/407 |

OTHER PUBLICATIONS

Rober Keller, "Expert System Technology Development and Application", ©1987 by Prentice-Hall Inc. pp. 80-95.

Primary Examiner—Roy N. Envall, Jr.
Assistant Examiner—Gita D. Shingala
Attorney, Agent, or Firm—Andrew J. Dillon

[57] ABSTRACT

A method and apparatus are disclosed for scheduling and confirming meetings in a data processing system which includes stored calendars for prospective attendees. A prompting screen is presented to a scheduler with blanks for keying in a desired meeting parameters including at least: a list of desired attendees; a desired date range; and a desired time span. A prompting screen is also presented to each prospective attendee to permit an attendee to key in attendee confirmation parameters which specify the conditions under which the prospective attendee will agree to attend a desired meeting. In a depicted embodiment of the present invention, a prospective attendee may identify selected attendees who must or must not attend a desired meeting in order to confirm the prospective attendees attendance at that meeting. A comparison of each prospective attendees' calendar with the desired meeting parameters and the attendee confirmation parameters is then utilized to determine if an available meeting time complies with all required parameters.

9 Claims, 4 Drawing Sheets

Fig. 1

```
                    SCHEDULE A MEETING
TYPE IN THE INFORMATION BELOW.
   SEARCH FROM THIS DATE:  9 / 9 / 87
   TO THIS DATE:            9 /11 / 87
   AMOUNT OF TIME NEEDED:  HOURS  2 MINUTES 30

CHECK THE FOLLOWING SCHEDULES.  TYPE ONE CONFERENCE ROOM NAME AND/OR
   USER NAME PER SPACE.  WHEN YOU HAVE FINISHED, PRESS ENTER.
   SMITH    _______________________   BROWN    _______________________
   JONES    _______________________   CONFERENCE ROOM A22____________
   JOHNSON  _______________________   _______________________________
   JACKSON  _______________________   _______________________________
            _______________________   _______________________________
            _______________________   _______________________________
            _______________________   _______________________________
            _______________________   _______________________________
            _______________________   _______________________________

PF9 HELP   PF12 RETURN
```

Fig. 2

```
                    SMITH ATTENDEE
                CONFIRMATION PARAMETERS

ENTER MEETING ATTENDEE NAMES WHO MUST CONFIRM SMITH ATTENDANCE
   JACKSON_____________              _______________________
   ___________________              _______________________
   ___________________              _______________________

ENTER MEETING ATTENDEE NAMES WHO MUST NOT CONFIRM FOR SMITH ATTENDANCE
   MARTIN______________              _______________________
   ___________________              _______________________

ENTER SPECIAL CASE MEETING ATTENDEES AND SELECT LOGICAL OPERATOR
   ___JONES___________    OR    ___BROWN______________

PF1 "OR"  PF2 "AND"              PF9 HELP     PF12 RETURN
```

Fig. 3

```
                                                          70
                      TIMES FOUND FOR A MEETING

SEARCHED FROM THIS DATE: 09/09/87
     TO THIS DATE:            09/11/87
     AMOUNT OF TIME NEEDED: HOURS 2 MINUTES 30

TO CHOOSE A DAY AND TIME, TYPE X NEXT TO YOUR CHOICE BELOW,
     CHANGE THE STARTING AND ENDING TIMES AS REQUIRED AND PRESS ENTER.

CHOICE   DAY         DATE        STARTING     ENDING
          _     WEDNESDAY   09/09/87     9:00 AM     12:00 PM
          _     WEDNESDAY   09/09/87     1:30 PM      5:00 PM
          _     THURSDAY    09/10/87    10:30 AM      6:00 PM
          _     FRIDAY      09/11/87     8:30 AM     11:45 AM
          _     FRIDAY      09/11/87     2:00 PM      5:15 PM

SCREEN   1 OF 1
     PF1 TRY ANOTHER  PF9 HELP  PF10 NEXT SCREEN  PF11 PREVIOUS SCREEN  PF12 RETURN
     1...+...10....+...20....+...30....+...40....+...50....+...60....+...70....+...80
```

*Fig. 4*

```
                                                          80
                       SEND A NOTICE OF A MEETING
     DATE TO BE SCHEDULED:  9/11/87
     STARTING TIME:         2:00 PM
     ENDING TIME:           5:15 PM

TYPE IN THE INFORMATION BELOW. THEN, PRESS PF7 TO SEND.

LOCATION:  THIRD FLOOR CONFERENCE ROOM (A22)__________________

PURPOSE:   WE NEED TO REVIEW THAT JANUARY SALES REPORT TO SEE IF WE NEED A_
                NEW APPROACH FOR OUR FORTHCOMING PRODUCT. PLEASE BRING YOUR ___
                MONTHLY REPORTS FOR THE LAST YEAR, AND THE FORECAST FOR THIS_
                YEAR._

PF1 TRY ANOTHER   PF2 CHANGE TIME   PF7 SEND   PF9 HELP   PF12 RETURN
     1...+...10....+...20....+...30....+...40....+...50....+...60....+...70....+...80
```

METHOD AND APPARATUS FOR MEETING CONFIRMATION IN A DATA PROCESSING SYSTEM

BACKGROUND OF THE INVENTION

1. Technical Field

The present invention relates in general to meeting scheduling and in particular to a method and apparatus for scheduling meetings in a data processing system. Still more particularly, the present invention relates to a method and apparatus for permitting a prospective meeting attendee to specify conditions under which the attendee will attend a meeting.

2. Description of the Related Art

Scheduling of meetings has always been fraught with problems. This is particularly the case when one scheduling a meeting, or a meeting scheduler, has no management or other control over those whose attendance is either desired or necessary.

The prior art initially eased the scheduling burden in that keyboard/display terminal user's schedules could be stored in varying calendar forms, and all could be available for call-up at each terminal. These schedules could be called and scanned to determine common available times. This was extremely time consuming if schedules were only available in narrative form on a day-at-a-time basis. Even when monthly abbreviated schedules or calendars were available for call-up, mental or pencil and paper notation of available times was both error-prone and no minor chore.

The prior art has now gone further in solving the above-noted problems. Calendar application programs, stored in a host computer to which the terminal users are connected, are able to read calendars of prospective attendees and provide a listing of available meeting times and dates. One example of such a system is disclosed in U.S. Pat. No. 4,626,836 issued to Donald E. Curtis, et al., and assigned to the assignee of the present application. Curtis et al. teaches a technique whereby available times and dates are derived from date and time ranges provided by the scheduler and from this listing a meeting scheduler may select a suitable time and date.

More recently, this technique has been enhanced in U.S. Pat. No. 5,050,077, assigned to the assignee herein, wherein the method whereby prospective attendees, calendars are examined has been greatly enhanced by providing an efficient method whereby prospective attendees' calendars may be examined and the contents thereof utilized to modify a preselected time span within a predetermined date span to provide possible options for desired meetings.

Despite the advances these systems represent in the calendaring art, there currently exists no method or apparatus whereby a prospective attendee may specify selected conditions under which that attendee will consent to attend a desired meeting. For example, a prospective attendee may determine that it will only be necessary for that attendee to attend a desired meeting if another specific attendee does not attend. By providing a system which permits prospective attendees to specify attendee confirmation parameters, the process of scheduling meetings in a data processing system may be greatly enhanced.

SUMMARY OF THE INVENTION

It is therefore one object of the present invention to provide an improved method of scheduling meetings.

It is another object of the present invention to provide an improved method of scheduling meetings within a data processing system utilizing stored attendee calendars.

It is yet another object of the present invention to provide an improved method and apparatus for scheduling meetings which permits prospective meeting attendees to specify conditions under which the attendee will attend a meeting.

The foregoing objects are achieved as is now described. The method and apparatus of the present invention may be utilized to schedule and confirm meetings in a data processing system which includes stored calendars for prospective attendees. A prompting screen is presented to a scheduler with blanks for keying in desired meeting parameters including at least: a list of desired attendees; a desired date range; and a desired time span. A prompting screen is also presented to each prospective attendee to permit an attendee to key in attendee confirmation parameters which specify the conditions under which the prospective attendee will agree to attend a desired meeting. In a depicted embodiment of the present invention, a prospective attendee may identify selected attendees who must or must not attend a desired meeting in order to confirm the prospective attendees attendance at that meeting. A comparison of each prospective attendees' calendar with the desired meeting parameters and the attendee confirmation parameters is then utilized to determine if an available meeting time complies with all required parameters.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
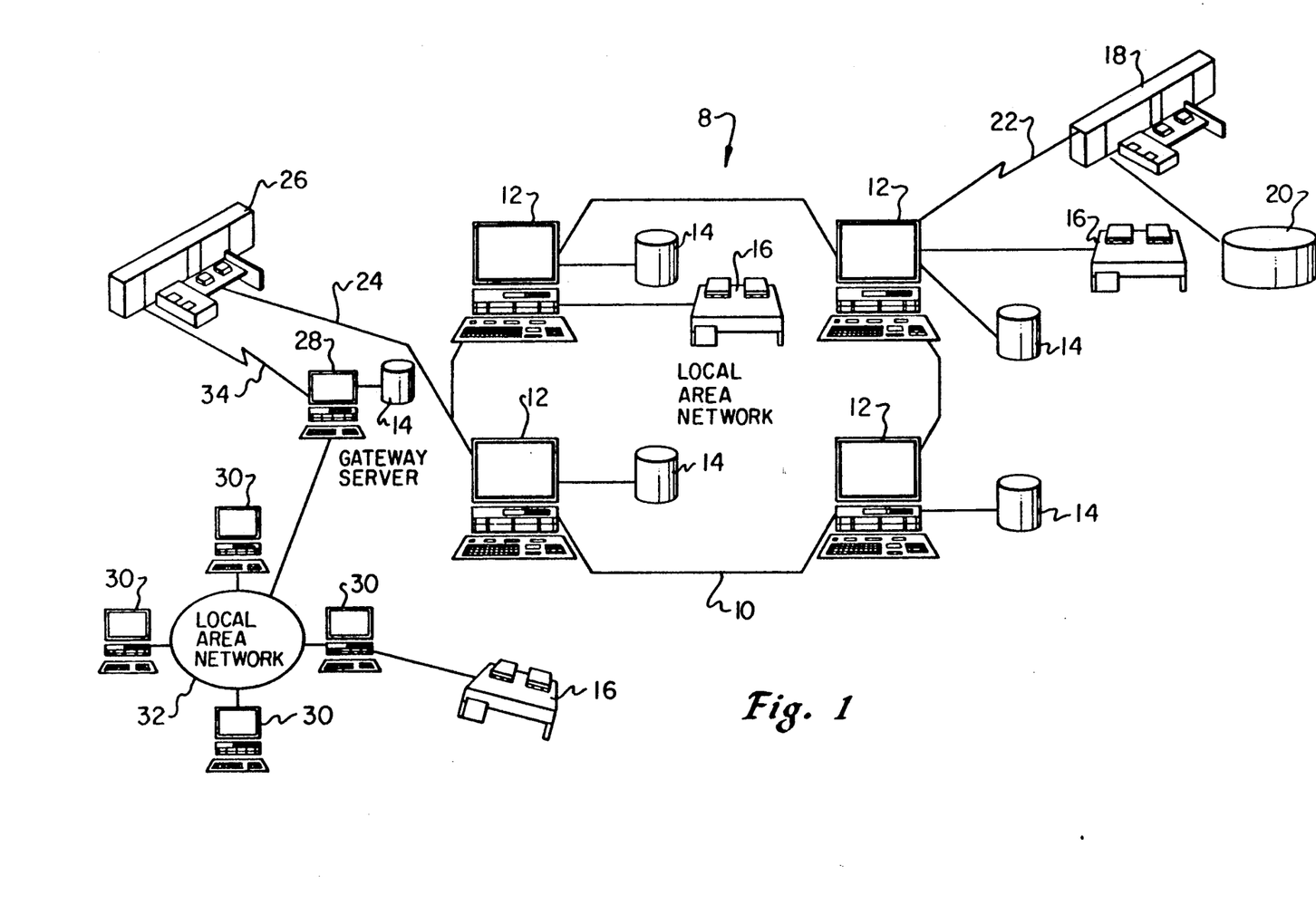
FIG. 1 is a pictorial representation of a distributed data processing system which may be utilized to implement the method and apparatus of the present invention.

With reference now to the figures and in particular with reference to FIG. 1, there is depicted a pictorial representation of a distributed data processing system 8 which may be utilized to implement the method and apparatus of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method and apparatus of the present invention, to store individual calendar event files and attendee confirmation parameters which may be periodically accessed by an individual within distributed data processing system 8 in an attempt to schedule a meeting in accordance with the method and apparatus of the present invention. In a manner well known in the prior art, each storage of calendar event files and/or attendee confirmation parameters may be stored within a storage device 14 which is associated with a Resource Manager which is responsible for maintaining and updating all documents associated therewith.

Still referring to FIG. 1, it may be seen that distributed data processing network 8 may also include multiple mainframe computers, such as mainframe computer 18, which may be preferably coupled to Local Area Network (LAN) 10 by means of communications link 22. Main frame computer 18 may also be coupled to a storage device 20 which may serve as remote storage for Local Area Network (LAN) 10 and may be coupled via communications controller 26 and communications link 34 to a gateway server 28. Gateway server 28 is preferably an independent computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of calendar event files and attendee confirmation parameters may be stored within storage device 20 and controlled by mainframe computer 18, as Resource Manager or Library Service for those files. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to attempt to schedule meetings with individuals in another portion of distributed data processing network 8. In order to accomplish this, numerous calendaring programs are available which may access calendar event files stored at any location within distributed data processing network 8 to determine whether or not an available meeting time exists which meets the desired meeting parameters selected by the meeting scheduler. However, such calendaring systems do not permit a prospective attendee to stipulate those conditions under which the attendee will consent to attend a meeting. Therefore, it should be apparent that a need exists for a system which will permit a prospective meeting attendee to set forth a plurality of meeting confirmation rules which may be utilized to determine whether or not that prospective attendee will confirm his or her attendance in response to a desired set of meeting parameters.

Figure 2:
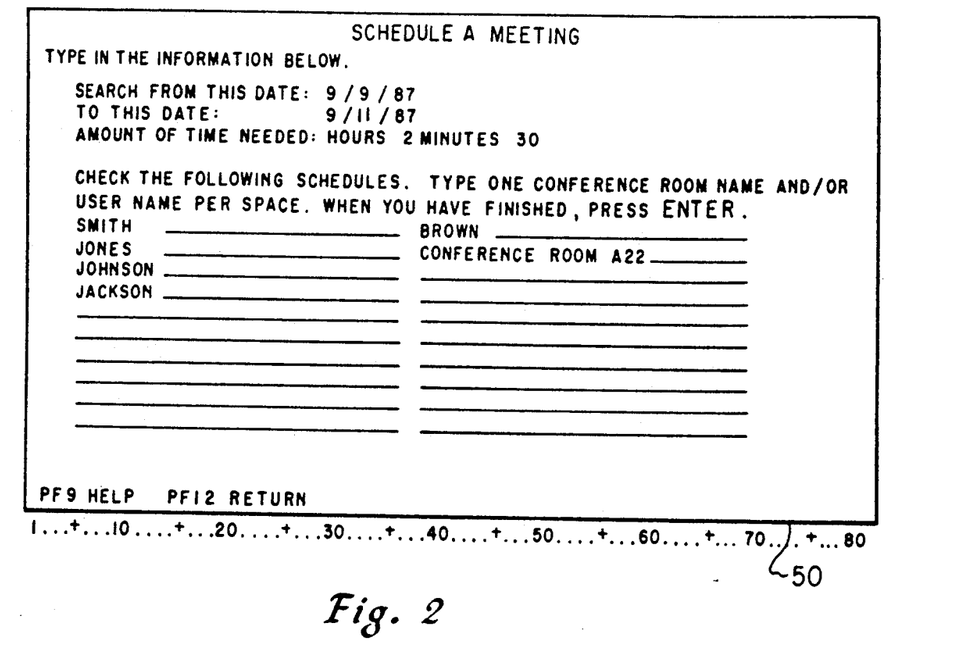
FIG. 2 is a pictorial representation of a prompting screen which is presented to a meeting scheduler in accordance with the method and apparatus of the present invention.

Referring now to FIG. 2, there is depicted a pictorial representation of a prompting screen 50 which is presented to a meeting scheduler at the beginning of the scheduling method of the present invention. Those skilled in the art will appreciate that the terms "meeting scheduler," "scheduler," "operator," and "user" are utilized interchangeably throughout the specification to refer to an individual utilizing the present invention. Prompting screen 50 is the initial screen called by, and presented to a keyboard/display terminal operator within distributed data processing network 8 (see FIG. 1) who desires to schedule a meeting. The operator then keys in the desired dates between which the meeting is to be scheduled, a minimum amount of time for the meeting, and a list of prospective attendees.

As illustrated within prompting screen 50, it may be seen that the scheduler desires to hold a meeting between Sep. 9, 1987 and Sep. 11, 1987 which must last at least two hours and thirty minutes. Further, the operator has requested that the individuals Smith, Jones, Johnson, Jackson, and Brown attend the meeting and that the meeting take place in Conference Room A22. Upon completion of keying in to the prompting screen of FIG. 2, the operator then depresses the ENTER key. This causes the contents of the prompting screen to be compared with each prospective attendees' calendar events in a manner which will be explained in greater detail herein. The keyboard/display terminals contemplated for use in the present invention are generally connected via land lines, hard wiring or other means to one or more host systems having processing, storage and retrieval capabilities. Configurations of this nature are old and well known in the art, with the most common displayed technique being a CRT display. Stored within the distributed data processing network are schedules or calendars of events for all terminal users. These schedules are prepared and changed by each user as necessary.

The results of a comparison between the contents of the prompting screen and the prospective attendees' schedules are available dates and meeting times where the parameters entered by the operator may be met. In known scheduling systems, these meeting times may be presented to the operator as an option list. However, in the event that no meeting time is available which meets the operator's meeting parameters, it is known to automatically vary selected meeting parameters to provide the operator with an optimal list of options, each including a deficiency wherein one parameter selected by the operator may not be met.

Figure 3:
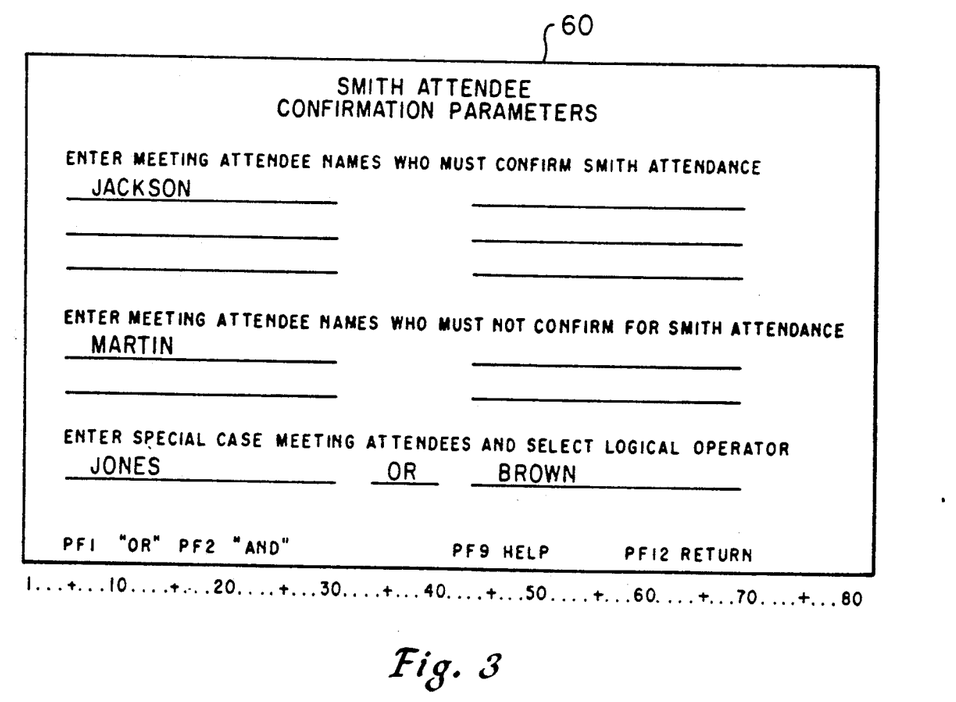
FIG. 3 is a pictorial representation of a prompting screen which is presented to a prospective attendee in accordance with the method and apparatus of the present invention.

With reference now to FIG. 3, there is depicted a pictorial representation of a prompting screen 60 which, in accordance with an important feature of the present invention, is presented to a prospective attendee. As is illustrated in FIG. 3, prompting screen 60 is a personal prompting screen for an individual user within distributed data processing network 8. Prompting screen 60 may be utilized by user Smith to key in various attendee confirmation parameters which may be utilized to determine whether or not user Smith will consent to attend a desired meeting.

As is illustrated within prompting screen 60, user Smith may enter meeting attendee names who must confirm their attendance at a meeting in order for user Smith to consent to attend. As illustrated, user Smith has entered the name Jackson, indicating that user Jackson must confirm attendance at any desired meeting prior to user Smith confirming his attendance at that meeting. Additionally, prompting screen 60 permits user Smith to enter meeting attendee names who must not confirm attendance at a meeting in order for Smith to consent to attend that meeting. Such a situation may exist in those circumstances wherein user Smith and another user have consented to substitute for each other and the attendance by both parties is not necessary. Thus, as illustrated in prompting screen 60, user Smith has entered the name Martin. In this manner, a desired meeting which includes user Smith as a desired attendee will not be confirmed by user Smith unless user Martin is not listed as a confirmed attendee for that meeting.

Additionally, prompting screen 60 may be utilized by user Smith to enter various special case meeting attendees who may be linked to other attendees utilizing various Boolean logical operators. For example, user Smith has utilized prompting screen 60 to indicate that he will attend a meeting only so long as user Jones or user Brown has confirmed for that meeting. By typing in various user names and then selecting an appropriate function key listed within prompting screen 60, user Smith may specify a set of confirmation rules which are governed by the Smith attendee confirmation parameters which determine whether or not user Smith will consent to attend any meeting which is desired to be scheduled.

Of course, those skilled in the art will appreciate that a graphic user interface may also be utilized in accordance with the method and apparatus of the present invention. That is, user Smith may utilize a graphic pointing device to drag a user name into a "must attend" or "must not attend" window within prompting screen 60 to accomplish the same purpose illustrated in FIG. 3.

Figure 4:
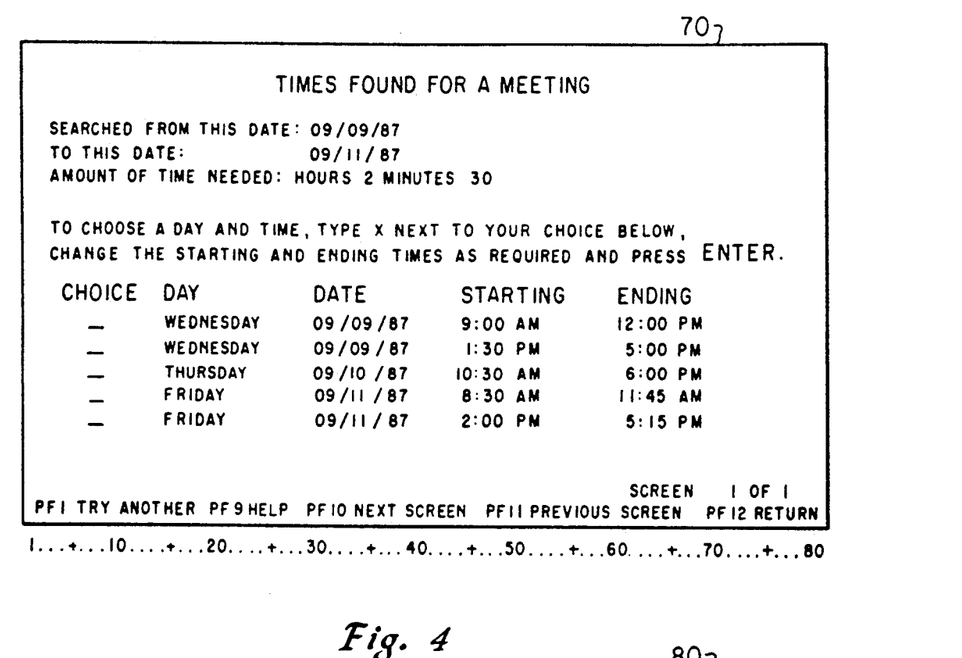
FIG. 4 is a pictorial representation of an option screen resulting from a comparison of desired meeting parameters, desired attendees' calendars and attendee confirmation parameters.

With reference now to FIG. 4, there is depicted a pictorial representation of an option screen 70 which results from a comparison of desired meeting parameters, desired attendees, calendars and attendee confirmation parameters in accordance with the method and apparatus of the present invention. As illustrated, prompting screen 70 includes a meeting option list which sets forth the day, date, starting time, and ending time of each possible meeting which may be scheduled as a solution to the scheduler's desired meeting parameters. Of course, those skilled in the art will appreciate that in a calendaring system wherein automatic variation of the desired meeting parameters is possible, prompting screen 70 may include as possible solutions to the scheduler's desired meeting parameters selected time spans, date spans and lists of attendees which do not fully meet all desired meeting parameters.

Figure 5:
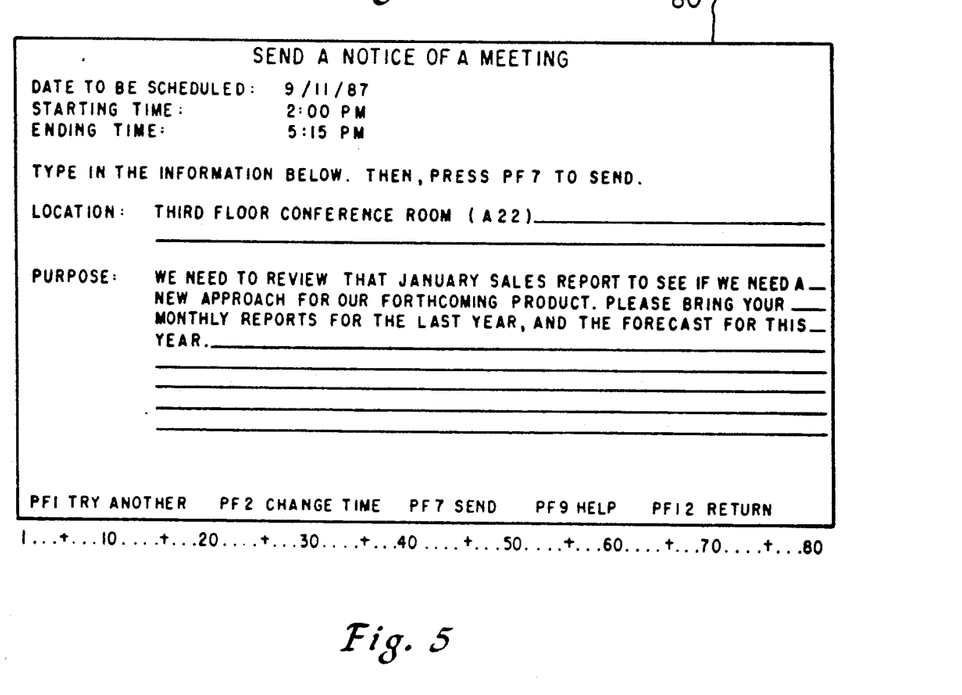
FIG. 5 is a pictorial representation of a meeting notification screen created in accordance with the method and apparatus of the present invention.

With reference now to FIG. 5, there is depicted a pictorial representation of a meeting notification screen 80, which is created in accordance with the method and apparatus of the present invention. Meeting notification screen 80 is preferably created by having the scheduler select an option from the meeting option list depicted in FIG. 4, and then prompting the scheduler to input the purpose for the meeting. Meeting notification screen 80 is then preferably utilized, in accordance with the method and apparatus of the present invention, to transmit a notice of the meeting to each prospective attendee via electronic mail or any other suitable means.

Figure 6:
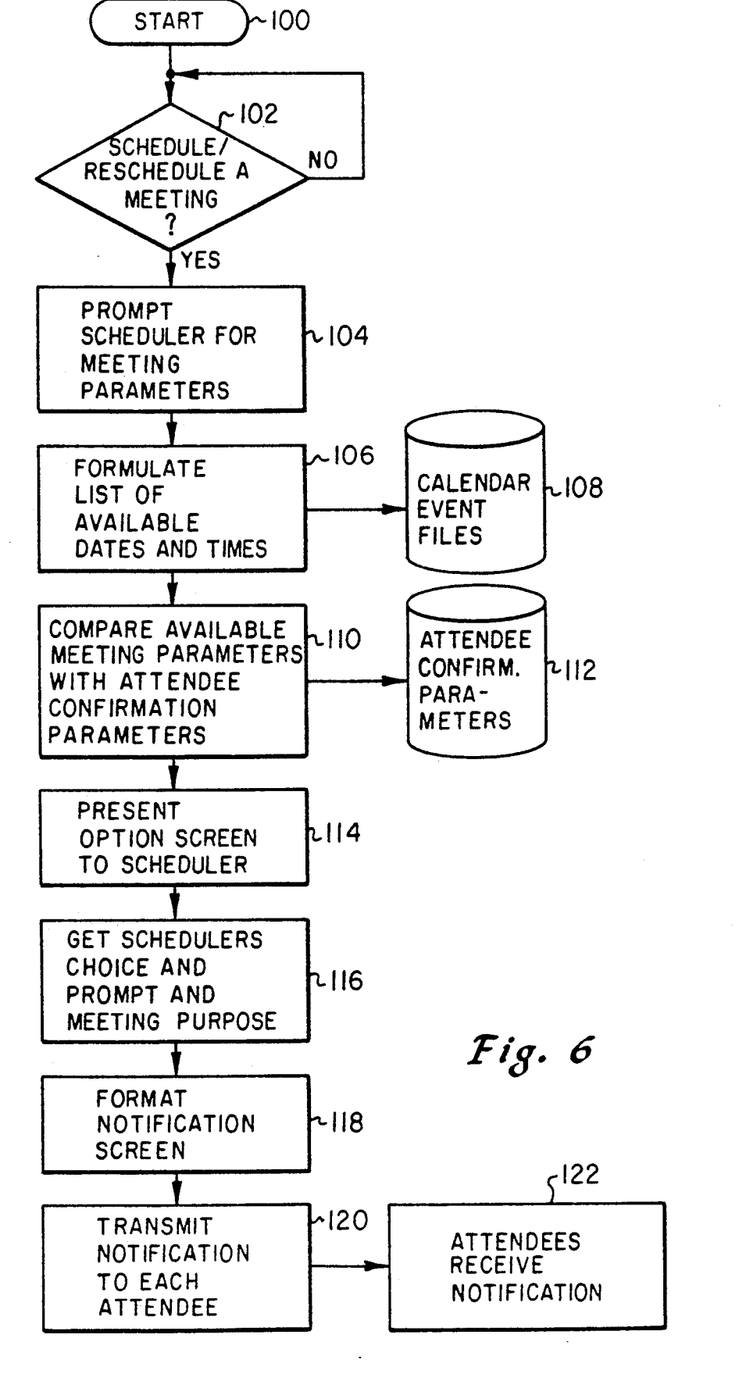
FIG. 6 is a logic flow chart illustrating the scheduling of a meeting in accordance with the method and apparatus of the present invention.

Finally, referring to FIG. 6, there is depicted a logic flow chart illustrating the scheduling of a meeting in accordance with the method and apparatus of the present invention. The process begins at block 100 and thereafter passes to block 102, which illustrates a determination of whether or not it is desired to schedule or reschedule the meeting. Those skilled in the art will appreciate that despite having previously scheduled a meeting an alteration to individual schedules of higher priority may necessitate the rescheduling of a meeting. Additionally, certain calendar systems permit prospective attendees to arbitrarily decide to attend or not attend a scheduled meeting. In either event, the confirmation of a meeting with regard to desired meeting parameters and attendee confirmation parameters must necessarily be reapplied to determine whether or not all parameters have been met as a result of a schedule change or a change in the attendee list brought about by a decision by one or more attendees to alter their confirmation status. In the event no scheduling or rescheduling is desired, the process merely iterates until such time as this event occurs.

In the event the scheduler desires to schedule or reschedule a meeting, as determined in block 102, the process passes to block 104 which illustrates the prompting of the scheduler for the meeting parameters. This process is accomplished utilizing prompting screen 50 of FIG. 2 and requires the scheduler to input a plurality of meeting parameters including at least a desired date span, a desired time span, and a list of prospective attendees. Additionally, in accordance with the illustrated embodiment of the present invention, the scheduler may input a desired location for the desired meeting. In this event, the calendaring function will necessarily examine the stored calendar events for the desired location to determine whether or not it is available for a meeting which complies with the desired meeting parameters.

Next, the process passes to block 106 which depicts the formulation of a list of available dates and times. This occurs, as illustrated in FIG. 6, by a reference to block 108 which illustrates the stored calendar event files for each prospective attendee within the distributed data processing network. By reviewing calendar event files as stored within the system, block 106 may, in accordance with any method well known in the art, formulate a list of available dates and times which comply with the desired meeting parameters, or alternatively, present the scheduler with an optimal list of options which include some deficiency from the desired meeting parameters.

Next, the process passes to block 110, which illustrates the comparing of the available meeting parameters with the attendees' confirmation parameters. This is accomplished by accessing stored attendee confirmation parameters, as depicted in block 112. Upon reference to the foregoing specification, those skilled in the art will appreciate that prompting screen 60 may be utilized by each prospective attendee to input a plurality of confirmation parameters which may then be stored at any appropriate location within distributed data processing network 8.

After comparing the desired meeting parameters of the scheduler with each prospective attendees' calendar event files and attendee confirmation parameters block 114 illustrates the presenting of an option screen to the scheduler. This option screen may be the type illustrated in FIG. 4 and includes a plurality of possible meeting options which either comply with all desired meeting parameters or represent an optimal solution where all meeting parameters may not be met. Next, the process passes to block 116 which illustrates the setting of the scheduler's choice and the prompting of the scheduler to input a purpose for the meeting. This information is then utilized to format a notification screen, such as notification screen 80 of FIG. 5.

Finally, block 120 illustrates the transmitting of a notification to each prospective attendee and block 122 illustrates the receipt of that notification by each prospective attendee.

Upon reference to the foregoing, those skilled in the art will appreciate that the present application discloses a method and apparatus whereby meetings may be confirmed and scheduled within a complex data processing system while efficiently permitting prospective attendees for each meeting to set forth a specific plurality of attendee confirmation parameters which will govern whether or not an attendee will consent to attend a particular meeting. In this manner, the efficient utilization of man power and managerial assets may be greatly enhanced by complying with such parameters as may be set forth by each attendee. Of course, those skilled in the art will appreciate that various deadlock breaking mechanisms may be utilized to solve a situation wherein individual prospective attendees confirmation parameters prevent a meeting which must occur.

While the invention has been particularly shown and described with reference to a preferred embodiment, it will be understood by those skilled in the art that various changes in form and detail may be made therein without departing from the spirit and scope of the invention.

We claim:

1. A method in a data processing system for scheduling a meeting utilizing attendee calendars stored in said data processing system, said method comprising the steps of:
   presenting a scheduler with a prompting screen for permitting said scheduler to key in a plurality of desired meeting parameters including at least: a list of desired attendees, a desired date range, and a desired time span;
   presenting a prospective attendee with a prompting screen for permitting said prospective attendee to key in a plurality of attendee confirmation parameters for specifying conditions under which said prospective attendee will attend a desired meeting;
   comparing in said data processing system said desired meeting parameters with each desired attendees' calendar and said attendee confirmation parameters; and
   presenting an option screen to said scheduler for displaying available times, if any, for selection of a meeting time which complies with said desired meeting parameters and said attendee confirmation parameters.

2. The method in a data processing system for scheduling a meeting utilizing attendee calendars stored in said data processing system according to claim 1, wherein said step of presenting a scheduler with a prompting screen for permitting said scheduler to key in a plurality of desired meeting parameters further includes the step of presenting a prompting screen for permitting said scheduler to key in a desired location for said meeting.

3. The method in a data processing system for scheduling a meeting utilizing attendee calendars stored in said data processing system according to claim 2, wherein calendars for desired locations are stored within said data processing system and wherein said step of comparing in said data processing system said desired meeting parameters with each desired attendee's calendar and said attendee confirmation parameters further includes the step of comparing said desired meeting parameters with a calendar for said desired location.

4. The method in a data processing system for scheduling a meeting utilizing attendee calendars stored in said data processing system according to claim 1, further including the step of permitting a scheduler to select an exact meeting time from available times displayed within said option screen.

5. The method in a data processing system for scheduling a meeting utilizing attendee calendars stored in said data processing system according to claim 4, further including the step of notifying each attendee of said meeting.

6. The method in a data processing system for scheduling a meeting utilizing attendee calendars stored in said data processing system according to claim 1, wherein said step of presenting a prospective attendee with a prompting screen for permitting said prospective attendee to key in a plurality of attendee confirmation parameters further includes the step of presenting a prompting screen for permitting a prospective attendee to key in an identification of an attendee who must attend said meeting in order to confirm attendance of said prospective attendee.

7. The method in a data processing system for scheduling a meeting utilizing attendee calendars stored in said data processing system according to claim 1, wherein said step of presenting a prospective attendee with a prompting screen for permitting said prospective attendee to key in a plurality of attendee confirmation parameters further includes the step of presenting a prompting screen permitting a prospective attendee to key in an identification of an attendee who must not attend said meeting in order to confirm attendance of said prospective attendee.

8. A data processing system for scheduling a meeting, said data processing system comprising:
   means for storing prospective attendee calendars within said data processing system;
   a prompting screen for permitting a scheduler to key in to said data processing system a plurality of desired meeting parameters including at least: a list of desired attendees; a desired date range; and a desired time span;
   a prompting screen for permitting a prospective attendee to key in to said data processing system a plurality of attendee confirmation parameters for specifying conditions under which said prospective attendee will attend a desired meeting;
   comparison means coupled to said data processing system for comparing said desired meeting parameters with each desired attendees' calendar and said attendee confirmation parameters; and an option screen for displaying available times, if any, for selection of a meeting which complies with said desired meeting parameters and said attendee confirmation parameters.

9. The data processing system for scheduling a meeting according to claim 8, further including notification means for notifying each attendee of said meeting.

* * * * *

Disclaimer

5,303,145—Susan F. Griffin; David L. Griffin, both of Keller; Patrick J. Keane, Grapevine, all of Tex. METHOD AND APPARATUS FOR MEETING CONFIRMATION IN A DATA PROCESSING SYSTEM Patent dated Apr. 12, 1994. Disclaimer filed Oct. 4, 2006, by the assignee, International Business Machines Corporation.

Hereby enter this disclaimer to all claims, of said patent.

*(Official Gazette, January 9, 2007)*